Feb. 27, 1934.  J. H. MURCH  1,948,532
SHEET METAL STRIP USED IN THE ART OF CUTTING
CIRCULAR AND OTHER NONRECTANGULAR BLANKS
Original Filed June 16, 1924
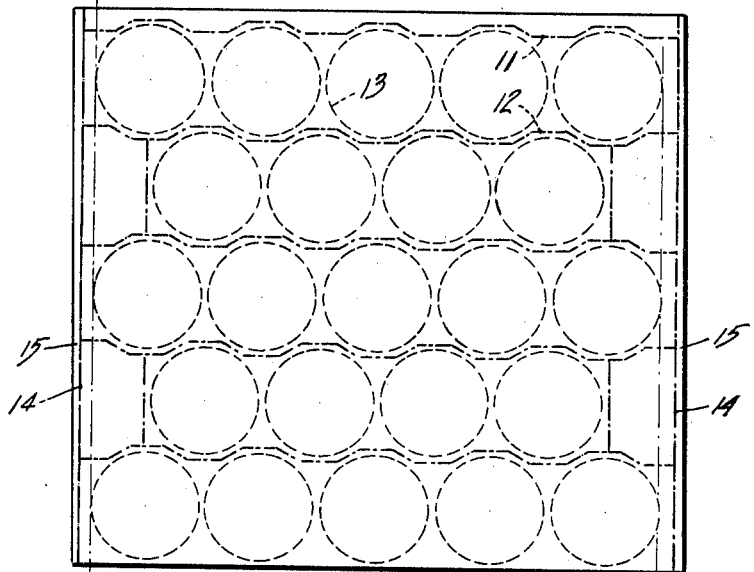
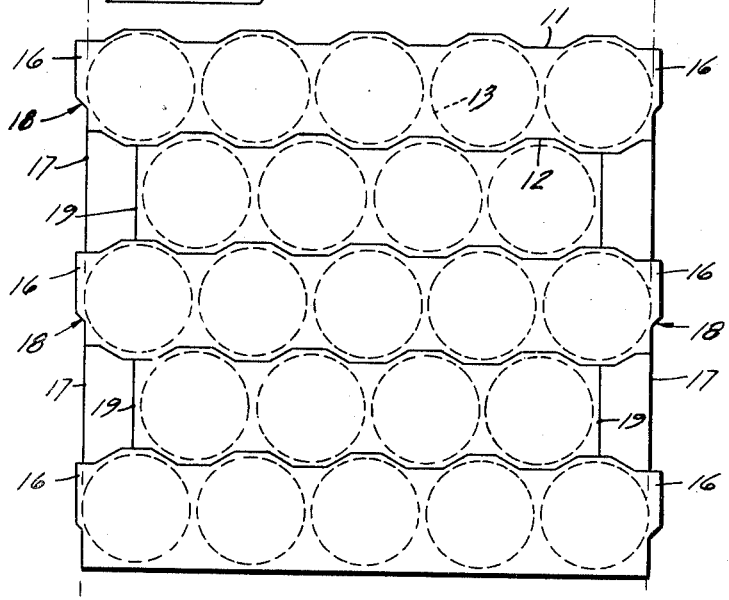
INVENTOR
John H. Murch
BY John C. Carpenter
ATTORNEY Patented Feb. 27, 1934

1,948,532

UNITED STATES PATENT OFFICE 1,948,532

SHEET METAL STRIP USED IN THE ART OF CUTTING CIRCULAR AND OTHER NON-RECTANGULAR BLANKS

John H. Murch, East Orange, N. J., assignor to American Can Company, New York, N. Y., a corporation of New Jersey Original application June 16, 1924, Serial No. 720,248. Patent No. 1,818,150, dated August 11, 1931. Divided and this application July 6, 1931. Serial No. 548,932

4 Claims. (Cl. 164—17)

This invention relates to forming of circular and other non-rectangular objects from sheet material, and while the invention has more particular reference to the cutting and forming of can ends, it will be readily understood that it has much broader and more general application. This is a division of my application Serial No. 720,248 filed June 16, 1924, granted Aug. 11, 1931, as Patent No. 1,818,150, for Art of cutting circular and other non-rectangular blanks from sheet metal.

A principal object of the present invention is the provision of a method of forming the can ends or other objects which will effect a substantial saving of the sheet material.

In the cutting of round, oval and other duplicate articles from sheet metal such as can ends, etc., the sheet is first cut into strips and these strips fed through a strip feed press to cut the blanks of the articles and form them. In order that wastage may be reduced to a minimum, these strips are cut by what is known in the industry as staggered row layout. In accordance with this layout the outlines of the articles to be cut usually of circular form, are arranged in rows across the sheet, the members in each row being staggered with respect to the members of the rows immediately above and beneath, so that across the sheet the top and bottom of one outline extends in toward the space between the adjacent outlines of the immediately adjacent rows.

When the strips are cut, a cut is made along a scroll or undulating line which provides enlarged portions in each row from which the articles are to be cut. Because of these undulations and the varying widths, accurate arrangement and feeding of the strips in the strip feed press is necessary. In the past it was required that each sheet be trimmed at its ends to provide accurate reference edges for the press feed members to engage in correct relationship with the dies. This trimming of the edges has resulted in an average wastage of one-eighth inch on each side of the sheet or a total wastage of the equivalent of one-fourth inch wide and having a length the width of the sheet. In the can making industry the number of articles made is, of course, enormous and this wastage on this account is an item of real magnitude. My invention contemplates the provision for accurate edge reference and engagement without requiring the trimming of the sheet or wastage above mentioned.

Numerous other objects and advantages of the invention will be apparent as it is better understood from the following description, which, taken in connection with the accompanying drawing, discloses a preferred embodiment thereof.

Referring to the drawing:

Figure 1 is a schematic view illustrating the staggered layout as applied to a sheet of tinplate and showing the trimming and other cutting operations used in previous methods of cutting; and Fig. 2 is a similar view illustrating a similar layout as applied to a sheet of tinplate and showing the improved cutting for producing improved strips embodying the present invention. In this figure the strip-forming scroll cuts are shown in full lines and the article-forming cuts in dotted lines.

In accordance with the staggered layout the sheet of tinplate or other material is cut into strips along lines 11 and 12, said lines 11 and 12 being broken or of scroll character to accommodate lines 13 of die action, enlargements, as shown, being alternately positioned in adjacent rows across the sheet.

Prior to my invention it has been necessary to trim along the line 14 at each side of the sheet to remove the strip 15 of approximately one-eighth inch width and in the use of my present invention this trimming is not performed and more of the sheet is preserved for useful cutting.

The staggered arrangement provides for the article-forming cuts extending nearly to the edge of the sheet on each side in alternate rows (see top and bottom rows in Figs. 1 and 2). There must or should be left about one-eighth inch between the line 13 of the strip feed press die cut and the edge of the sheet. That is to say, the dies in the strip feed press require approximately one-eighth inch of material outside the cut for proper functioning. This last mentioned material is in addition to the trimming already described so that the dies of the strip feed press cut in accordance with prior practice a quarter of an inch from the sheet edge.

In accordance with my present invention I propose to notch these alternate strips, as indicated at 17, cutting back one-eighth inch at a corner, leaving the part 16 at the end of the longitudinal center of the strip. Preferably the inner part of the notch is angled off at 18 into the uncut part of the strip. The notching of the sheet in this manner produces trimmed and accurate feeding edges at an end of each alternate and longer strip and eliminates the necessity of trimming the sheet as hereinbefore described, since it is unimportant whether the remaining edge of the unnotched portion of the strip be entirely accurate if the bottom of the notch may be engaged by the feeding members of the strip feed press for feeding the strips.

The notch may be conveniently provided by cutting away the material across the ends of intermediate strips. An accurate reference edge is provided for the strips intermediate those having the notched edges by cutting on lines 19 one-eighth inch away from the die line of cut 13.

By my new method of notching sheets of tinplate, smaller size sheets of tinplate are required from the tinplate mills and when the saving of tinplate area on one sheet is multiplied by the thousands of sheets used in one can making factory alone the importance of the invention becomes at once apparent.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A strip from which non-rectangular articles are to be formed, which has a part of its end trimmed and notched and a part untrimmed, said trimmed part having accurate relation to the spaces from which said articles are to be cut so as to serve as an edge by which the strip may be accurately fed, and a portion of said untrimmed part being located at the middle of the strip, said untrimmed part forming a portion of the original edge of the sheet.

2. A strip from which non-rectangular articles are to be formed, which has a part of its end trimmed and notched and a part untrimmed, said trimmed part having accurate relation to the spaces from which said articles are to be cut so as to serve as an edge by which the strip may be accurately fed, and a portion of said untrimmed part being located at the middle of the strip, the inner part of the notch having an angularly arranged edge, said untrimmed part forming a portion of the original edge of the sheet.

3. A sheet for cutting into scroll strips to form alternating longer and shorter strips from which rows of articles are to be punched, an edge of the sheet which extends crosswise to the scroll cuts which are to be made being notched across the ends of the spaces which are to form the shorter strips, and partly across the spaces which are to form the longer strips, leaving untrimmed portions of the sheet at the middle parts of the ends of the longer strips, said untrimmed portions forming parts of the edge of the sheet.

4. A sheet for cutting into scroll strips to form alternating longer and shorter strips from which rows of articles are to be punched, the two edges of the sheet which extend crosswise to the scroll cuts which are to be made being notched across the ends of the spaces which are to form the shorter strips, and partly across the spaces which are to form the longer strips, leaving untrimmed portions of the sheet at the middle parts of the ends of the longer strips, said untrimmed portions forming parts of the edge of the sheet.

JOHN H. MURCH.